Jan. 1, 1963   R. L. SCHINNERER   3,071,347
VARIABLE AREA NOZZLE DEVICE
Filed Dec. 30, 1959
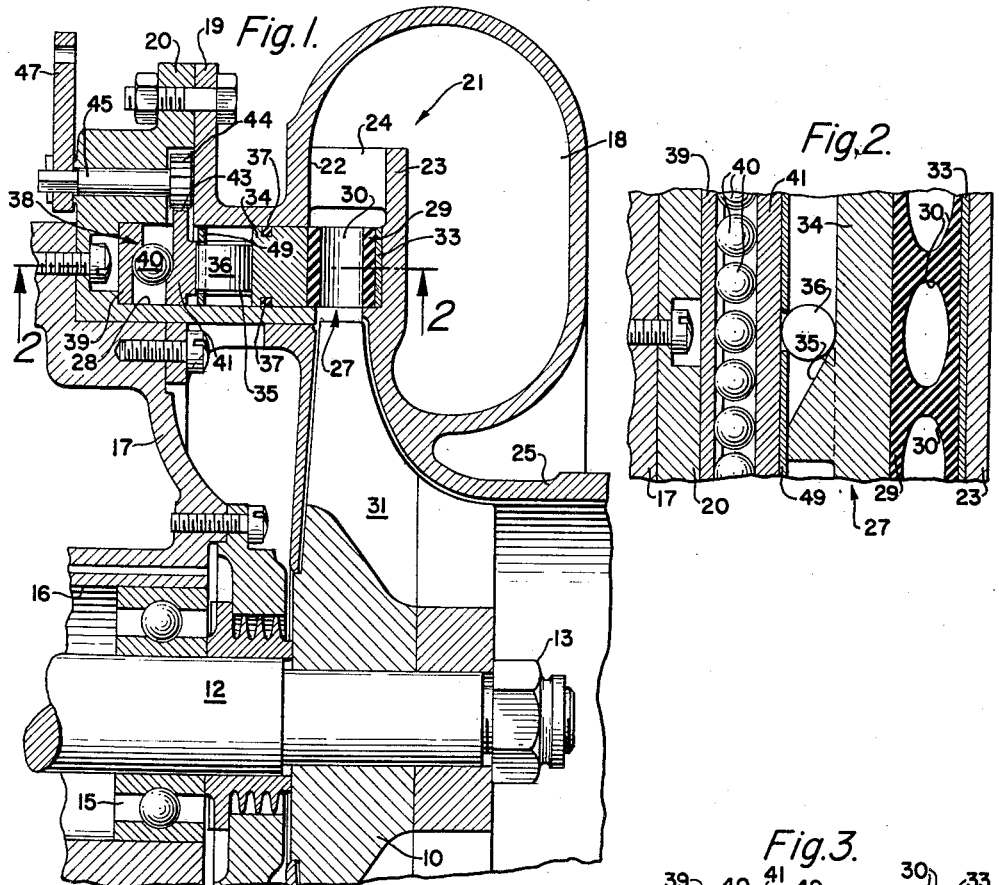
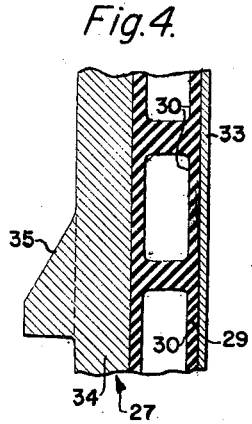
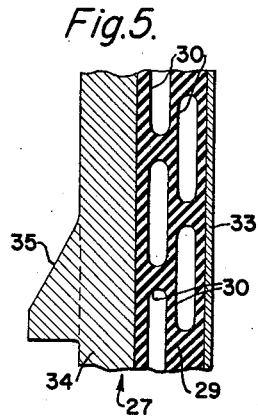
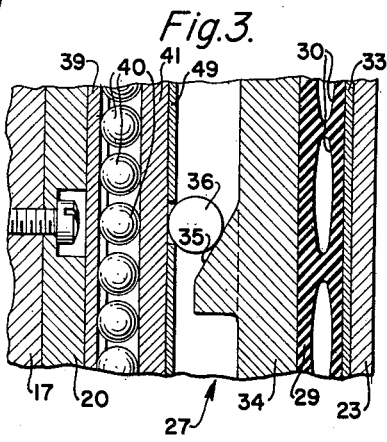
INVENTOR:
ROY L. SCHINNERER,
BY J. Thomas Eubanks
Attorney.

United States Patent Office 3,071,347
Patented Jan. 1, 1963

3,071,347
VARIABLE AREA NOZZLE DEVICE
Roy L. Schinnerer, Long Beach, Calif., assignor to The Garrett Corporation, Los Angeles, Calif., a corporation of California
Filed Dec. 30, 1959, Ser. No. 862,864
8 Claims. (Cl. 253—97)

This invention relates generally to variable area nozzles, and has particular reference to a variable area nozzle for fluid turbines of the radial inflow type.

In order to maintain reasonably constant efficiency in fluid turbines under varying operating conditions, it is common practice to provide a variable area nozzle system around the periphery of the entrance of the turbines. Tilting or pivoted types of nozzle vanes have been utilized in prior devices to vary the effective nozzle area, but mechanism of this type requires complicated linkage and close machining tolerances. This is especially true when mechanism of this type is provided for very small turbomachines.

It is therefore an object of the present invention to provide a variable area nozzle device that is simple in construction and requires a minimum of machining.

It is a further object of the invention to provide a variable area nozzle device that is especially adaptable for use on small turbomachines.

It is still a further object of the invention to provide, in connection with fluid turbines, a variable area nozzle, comprising a member of resilient material having a plurality of passages arranged to deliver the requisite quantity of propulsion fluid to the turbine, and means for compressing the member to restrict the area of the passages.

Another object of the invention is to provide a variable area nozzle device having a minimum leakage flow through the nozzle. In the type of variable area nozzle means having a plurality of rotatable air-foil shaped nozzle vanes, there is a slight clearance between the edges of the vanes and the nozzle passage and fluid in the entry passage leaks past the vanes through this clearance. The direction of flow of the fluid which leaks past the nozzle vanes is at an angle to the direction of the propulsion fluid flowing through the nozzle vanes to the turbine. This cross flow lowers the efficiency of the turbine. In the variable area nozzle device of the subject application there is only a single flow from the entry passage to the turbine, that is, through the passages of the resilient member. There is no leakage past the resilient member, consequently, there is no cross flow of fluid in this type of nozzle.

Other objects and features of the invention will be more apparent to those skilled in the art from the following detailed description of a preferred embodiment taken in conjunction with the accompanying drawing in which:

FIG. 1 is a transverse section through a turbine showing the variable area nozzle positioned to give a maximum rate of flow;

FIG. 2 is a cross-section on line 2—2 of FIG. 1;

FIG. 3 is a section similar to FIG. 2 showing the variable area nozzle restricted to give a lower rate of flow;

FIG. 4 is a sectional view of the resilient member illustrating a slightly modified form of passages in the member; and FIG. 5 is a further alternative form of passages in the resilient member.

Referring to FIG. 1 of the drawing, there is shown a turbine having a radial flow type turbine rotor 10 secured on a shaft 12 by a nut 13 threaded on the outer end thereof. The shaft 12 is journaled in a bearing 15 which is mounted in a bearing casing 16 connected to a portion of the housing 17.

Located at the periphery of the turbine rotor 10 is an inlet plenum 18 having an annular portion 19 secured to a flange 20 of the housing 17. The plenum 18 includes an annular nozzle box 21 having spaced side walls 22 and 23 between which are secured a plurality of vanes 24. The side wall 23 is extended inwardly and shaped to form an outlet 25 for the exhaust of fluid from the turbine. High pressure fluid from a pressure source such as an engine, not shown, is delivered through the inlet plenum 18 and nozzle box 21 to a variable area nozzle device, indicated generally at 27.

The variable area nozzle device 27 is inserted in a cavity 28 formed between the annular portion 19 of the plenum 18 and the flange 20 of the housing 17 and includes an annular member 29 of rubber or other resilient material having a plurality of passages 30 extending therethrough to direct high pressure fluid from the nozzle box 21 to the blades 31 of the turbine rotor 10. Metal plates 33 and 34 having an annular configuration corresponding to that of the resilient member 29 are bonded respectively to the outer and inner sides of the resilient member. The inner side of plate 34 is provided with a plurality of ramps 35 adapted to co-operate with rollers 36, in the manner hereinafter described, to vary the area of the passages 30. To prevent leakage of air past the plate 34, sealing rings 37 are placed at the inner and outer diameters of the plate.

A bearing 38 consisting of race 39, balls 40, and race 41 is placed within the inner portion of the cavity 28 so that race 41 bears against rollers 36, the rollers in turn bearing against the ramp 35 on plate 34. The outer periphery of race 41 contains gear teeth 43 adapted to mesh with a gear 44 mounted on the end of a shaft 45 and a lever 47 is secured to the outer end of the shaft 45 for rotating the shaft and the gear 44. The lever 47 may be actuated manually or by a suitable control mechanism, not shown, which may be regulated in accordance with the load requirements upon the turbine, or in accordance with other criteria such as temperature, speed or whatever. A cage 49 is interposed between the rollers 36 to maintain synchronism of the rollers.

In operation, movement of the lever 47 causes shaft 45 and gear 44 to rotate, which in turn causes race 41 of the bearing 38 to rotate. Rotation of the race 41 causes the rollers 36 to rotate and climb the ramp 35 on plate 34, thereby moving the plate 34 in an axial direction. This axial movement compresses the resilient material in the ring 29 thereby reducing the cross-sectional area of the nozzle passages 30, as shown in FIG. 3.

The passages in the resilient annular member 29 may be made in a variety of shapes and forms. The member 29 may, for example, be provided with substantially elliptically shaped holes, as shown in FIG. 2, with rectangular cross-section passages as shown in FIG. 4, or with a plurality of axially spaced rows of staggered passages as indicated in FIG. 5. However, it is to be understood that the form and shape of the passages are not to be limited to the types shown in the drawing but may be of any form or shape apparent to those skilled in the art. It should be noted that the annular plate 34 has sufficiet freedom of movement to accommodate any circumferential shifting of the resilient member 29 that may take place during the axial movement of the plate.

While the variable area nozzle device is described and has particular utility for use with fluid turbines of the radial inflow type, it is to be understood that its utility is not limited thereto. The variable area nozzle device may, for example, be utilized for controlling fluid flow through the inlet of an axial flow compressor or the inlet of a vortex tube, or may be utilized in many other applications, as will be apparent to those skilled in the art.

I claim:

1. A variable area nozzle for controlling the flow of a fluid from an inlet plenum to a point of use, comprising: a generally annularly shaped member of resilient material adapted to be disposed between the inlet plenum and the point of use, said member having a plurality of passages therethrough positioned to direct the fluid from the inlet plenum to the point of use; and means for deforming the annular member to vary the area of the passages in said member.

2. A variable area nozzle for controlling the flow of a fluid from an inlet plenum to a point of use, comprising: a generally annularly shaped member of resilient material adapted to be disposed between the inlet plenum and the point of use, said member having a plurality of passages therethrough positioned to direct the fluid from the inlet plenum to the point of use; a first annular plate secured to one side of said annular member; a second annular plate secured to the other side of said annular member; and means for moving one of said plates relative to the other of said plates to deform the annular member to vary the area of the passages in said member.

3. A variable area nozzle for controlling the flow of a fluid from an inlet plenum to a point of use comprising: a generally annularly shaped member of resilient material adapted to be disposed between the inlet plenum and the point of use, said member having a plurality of passages therethrough positioned to direct the fluid from the inlet plenum to the point of use; plate means secured on opposite sides of said annular member; and means operatively connected with the plate means for moving said plate means to deform the annular member to vary the area of the passages in said member.

4. In a turbine of the type having a housing, a rotor journaled in said housing and a passageway formed by said housing for receiving a driving fluid, a variable area nozzle means, comprising: a generally annular member of resilient material disposed in said passageway, said annular member having a plurality of passages for directing driving fluid through said passageway to said rotor, said annular member having one side fixedly positioned in the turbine housing; a generally annular plate secured to the other side of said annular member; and means for reciprocally moving said annular plate in a direction to deform the annular resilient member to vary the area of the passages in said annular member.

5. In a turbine of the type having a housing, a rotor journaled in said housing and a passageway formed by said housing for receiving a driving fluid, a variable area nozzle means, comprising: a generally annular member of resilient material disposed in said passageway, said annular member having a plurality of passages for directing driving fluid through said passageway to said rotor; plate means secured on said annular member, said plate means having ramp portions; and means adapted to engage said ramp portions to move said plate means to deform the annular resilient member to vary the area of the passages in said member.

6. In a turbine of the type having a housing, a rotor journaled in said housing and a passageway formed by said housing for receiving a driving fluid, a variable area nozzle means, comprising: a generally annular member of resilient material disposed in said passageway, said annular member having a plurality of passages for directing driving fluid through said passageway to said rotor; plate means secured on said annular member; and cam means operatively associated with said plate means to move said plate means to deform the annular resilient member to vary the area of the passages in said member.

7. In a turbine of the type having a housing, a rotor journaled in said housing and a passageway formed by said housing for receiving a driving fluid, a variable area nozzle means, comprising: a generally annular member of resilient material disposed in said passageway, said annular member having a plurality of passages for directing driving fluid through said passageway to said rotor; plate means secured on said annular member, said plate means having ramp portions; roller means arranged to engage said ramp portions; and actuating means disposed to roll said roller means up said ramp portions to move said plate means to deform the annular resilient member to vary the area of the passages in said member.

8. In a turbine of the type having a housing, a rotor journaled in said housing and a passageway formed by said housing for receiving a driving fluid, a variable area nozzle means, comprising: a generally annularly shaped member of deformable material disposed in said passageway, said member having a plurality of passages for directing driving fluid through said passageway to said rotor; and means for deforming the annularly shaped member to vary the area of the passages in said member.

References Cited in the file of this patent

UNITED STATES PATENTS

| 1,415,981 | Bouche | May 16, 1922 |
| 2,167,952 | Jordan | Aug. 1, 1939 |
| 2,313,550 | Huber | Mar. 9, 1943 |
| 2,351,328 | Gent | June 13, 1944 |
| 2,624,364 | Detlefsen | Jan. 6, 1953 |
| 2,641,282 | Hazlett | June 9, 1953 |
| 2,739,782 | White | Mar. 27, 1956 |
| 2,827,919 | Rice et al. | Mar. 25, 1958 |
| 2,846,179 | Monckton | Aug. 5, 1958 |

FOREIGN PATENTS

| 533,545 | Germany | Sept. 18, 1931 |